United States Patent
Yishai et al.

(10) Patent No.: US 8,160,350 B2
(45) Date of Patent: Apr. 17, 2012

(54) METHOD AND SYSTEM FOR EVALUATING A VARIATION IN A PARAMETER OF A PATTERN

(75) Inventors: Michael Ben Yishai, Natanya (IL); Mark Wagner, Rehovot (IL); Avishai Bartov, Hod Hasharon (IL); Gadi Greenberg, Tel Aviv (IL); Lior Shoval, Rehovot (IL); Ophir Gvirtzer, Rehovot (IL)

(73) Assignee: Applied Materials Israel, Ltd., Rehovot (IL)

( * ) Notice: Subject to any disclaimer, the term of this patent is extended or adjusted under 35 U.S.C. 154(b) by 832 days.

(21) Appl. No.: 11/994,412

(22) PCT Filed: Feb. 1, 2007

(86) PCT No.: PCT/IL2007/000130
§ 371 (c)(1),
(2), (4) Date: Nov. 6, 2008

(87) PCT Pub. No.: WO2007/088542
PCT Pub. Date: Aug. 9, 2007

(65) Prior Publication Data
US 2009/0196487 A1 Aug. 6, 2009

Related U.S. Application Data

(60) Provisional application No. 60/764,514, filed on Feb. 1, 2006.

(51) Int. Cl.
*G06K 9/00* (2006.01)
(52) U.S. Cl. .................................. 382/145
(58) Field of Classification Search .............. None
See application file for complete search history.

(56) References Cited

U.S. PATENT DOCUMENTS 6,268,093 B1 * 7/2001 Kenan et al. ................. 430/30
6,660,436 B1 * 12/2003 Chen et al. ................... 430/5

* cited by examiner

*Primary Examiner* — Tu Nguyen
(74) *Attorney, Agent, or Firm* — SNR Denton US LLP (57) ABSTRACT

A method and system are presented for evaluating a variation of a parameter of a pattern. The method includes processing data indicative of an aerial intensity image of at least a portion of a patterned article, and determining values of a certain functional of the aerial image intensity for predetermined regions within the at least portion of the patterned article. The values of the aerial image intensity functional are indicative of a variation of at least one parameter of the pattern within the at least portion of the patterned article or are indicative of a variation of at least one parameter of a pattern manufactured by utilizing the patterned article.

34 Claims, 10 Drawing Sheets

METHOD AND SYSTEM FOR EVALUATING A VARIATION IN A PARAMETER OF A PATTERN

CROSS REFERENCES TO RELATED APPLICATIONS

The present patent application is a National Stage under 35 USC 365 and claims priority to PCT international Application No. PCT/IL2007/000130 filed Feb. 1, 2007, incorporated herein by reference, which claims priority benefit from U.S. Provisional Patent Application No. 60/764,514 filed Feb. 1, 2006.

FIELD OF THE INVENTION

This invention is generally in the field of automatic optical inspection of patterned articles, such as semiconductor wafers, printed circuit boards and reticles (also referred to as lithography masks).

BACKGROUND OF THE INVENTION

The performance of micro-electronic devices has always been limited by the variations found in the dimensions of their critical features, termed critical dimensions or CD. Microelectronic devices are often manufactured using masks (or reticles) in a photolithography process. The latter is one of the principal processes in the manufacture of semiconductor devices, and consists of patterning the wafer's surface in accordance with the circuit design of the semiconductor devices to be produced. Such a circuit design is first patterned on a mask. Hence, in order to obtain operating semiconductor devices, the mask must be defect free. Moreover, the mask is often used in a repeated manner to create many dies on the wafer. Thus, any defect on the mask will be repeated multiple times on the wafer and will cause multiple devices to be defective. Establishing a production-worthy process requires tight control of the overall lithography process. Within this process, CD control is a determining factor with respect to device performance and yield.

When the critical dimensions are large, systematic variations in the dimensions of the device, such as those caused by material physics or as a result of equipment or the production process, do not make large contributions to the overall error budget and can therefore be largely ignored. However, as the minimum size of critical features drops below about 65 nm, systematic variations that were previously ignored can now consume a considerable portion of the overall error budget. Specifically, systematic mask CD errors can consume over 50% of the total wafer lithography process CD budget.

Therefore, various mask inspection tools have been developed and are available commercially. According to the known techniques of designing and evaluating masks, the mask is created and used to expose therethrough a wafer, and then a check is performed to determine whether the features of the mask have been transferred to the wafer according to the design. Any variations in the final features from the intended design necessitate modifying the design, creating a new mask, and exposing a new wafer.

The above procedure can be made simpler using the Aerial image Measurement System (AIMS). The AIMS is basically an engineering tool, which is intended for the development and testing of various mask designs. It is also helpful for checking how Optical Proximity Correction (OPC) and phase shift features would print on the wafer. Additionally, the system can be used to study various defects discovered by a mask inspection system, and test whether those defects would actually print on the wafer. Some systems have been developed using the principles of aerial imaging for the mask inspection, as disclosed for example in U.S. Pat. Nos. 5,481,624; 5,795,688; and 7,072,502. Also, the use of aerial imaging in the mask inspection is described in the article "Aerial-image-based off-focus inspection: lithography process window analysis during mask inspection", Shirley Hemar et al., Proceedings of SPIE, Volume 5256, 23rd Annual BACUS Symposium on Photomask Technology, December 2003, pp. 500-509.

Generally speaking, the AIMS™ is an optical system for evaluating masks under specific stepper or scanner settings of numerical aperture (NA), partial coherence of illumination or pupil filling, wavelength and illumination type (like circular, annular, quadrupole or dipole off-axis illumination). By flexible, automated adjustment of any setting to match conditions like in 193 nm exposure tools, it can emulate for any type of masks like binary, OPC and phase shift, designed for 193 nm lithography. The image taken with the system is optically equivalent to the latent image incident on the photoresist of the wafer, but magnified and recorded with a Charged Couple Device (CCD) camera. Thus, the AIMS™ tool allows a rapid prediction of the wafer printability of critical features, like dense patterns or contacts, defects or repairs on the mask without the need to do real wafer prints using the exposure tool and a following Scanning Electron Microscope (SEM) measurement of the printed features.

There is a need to provide systems and methods for evaluating at least one parameter of a pattern.

SUMMARY OF THE INVENTION

A method for evaluating a variation of a parameter of a feature, the method includes: receiving data representative of an aerial image of at least a portion of a patterned article that includes multiple instances of the feature, and processing the data to determine variations of the parameter of the feature.

Conveniently, the processing includes calculating a value of a functional of an aerial image intensity for each selected region of the patterned article.

Conveniently, the processing further includes determining variations of at least one feature that is manufactured by utilizing the patterned article.

Conveniently, the stage of receiving is preceded by generating the data.

Conveniently, the stage of processing includes comparing between functional values associated with different selected regions.

Conveniently, the stage of processing is followed by generating a feature variation map, the feature variation map including multiple feature variation map pixels.

Conveniently, the method further includes determining a size of the feature variation map pixel.

Conveniently, the patterned article is a mask and the stage of receiving includes receiving data representative of an entire mask.

Conveniently, each selected region includes a periodical pattern that includes multiple features that are arranged in a periodical manner; and the functional of the aerial image intensity is an aerial image intensity integral.

Conveniently, the parameter is a critical dimension of the feature.

Conveniently, each selected region includes a non-periodic pattern that includes the feature; and the selected regions are selected by applying to the aerial image data a pattern recognition algorithm.

Conveniently, the stage of receiving includes receiving data representative of multiple different frames; and the processing includes compensating for differences in a generation of the different frames.

Conveniently, the compensating includes compensating for inter-frame illumination variations.

Conveniently, the compensating for inter-frame illumination and acquisition variations includes: partitioning each frame to multiple sub-frames; calculating intra-frame coefficients by averaging aerial intensity values for sub-frames positioned at the same location within different frames.

Conveniently, the compensating includes: receiving information representative of aerial intensities of multiple partially overlapping frame images; and determining a difference in an acquisition of each of the multiple partially overlapping frame images in response to a difference between different representations of an overlap area in each of the partially overlapping frame images.

Conveniently, the compensating includes calculating illumination gain coefficients such as to minimize differences between representations of overlap areas of partially overlapping frames.

Conveniently, the compensating includes calculating the illumination gain coefficients so that an average illumination gain coefficient is one.

Conveniently, the compensating includes calculating inter-frame and intra-frame gain coefficients by solving a non-linear set of equations.

Conveniently, the compensating is responsive to statistics of aerial intensity values within selected areas of the patterned article, a selected area being much larger than a sub-area in which values of the intensity correlate.

Conveniently, the receiving includes receiving data representative of multiple aerial images of the at least portion, different aerial images being acquired under different focal conditions; and processing the data to determine variations of the parameter of the feature.

A system for evaluating a variation of a parameter of a feature, the system includes: an interface adapted to receive data representative of an aerial image of at least a portion of a patterned article that includes multiple instances of the feature, and a processor adapted to process the data to determine variations of the feature.

Conveniently, the processor calculates a value of a functional of an aerial image intensity for each selected region of the patterned article.

Conveniently, the processor determines variations of at least one feature that is manufactured by utilizing the patterned article.

Conveniently, the processor is adapted to generate the data before providing the data to the interface.

Conveniently, the processor compares between functional values associated with different selected regions.

Conveniently, the processor generates a feature variation map, and the feature variation map includes multiple feature variation map pixels.

Conveniently, the processor determines a size of the feature variation map pixel.

Conveniently, the patterned article is a mask and the interface receives data representative of an entire mask.

Conveniently, each selected region includes a periodical pattern that includes multiple features that are arranged in periodical manner; and the functional of the aerial image intensity is an aerial image intensity integral.

Conveniently, the parameter is a critical dimension of the feature.

Conveniently, each selected region includes a non-periodic pattern that includes the feature; and the processor selects regions by applying to the aerial image data a pattern recognition algorithm.

Conveniently, the interface receives data representative of multiple different frames; and the processor compensates for differences in a generation of the different frames.

Conveniently, the processor compensates for inter-frame illumination variations.

Conveniently, the processor partitions each frame into multiple sub-frames; and calculates intra-frame coefficients by averaging aerial intensity values for sub-frames positioned at the same location within different frames.

Conveniently, the processor: receives information representative of aerial intensities of multiple partially overlapping frame images; and determines a difference in an acquisition of each of the multiple partially overlapping frame images in response to a difference between different representations of an overlap area in each of the partially overlapping frame images.

Conveniently, the processor calculates illumination gain coefficients such as to minimize differences between representations of overlap areas of partially overlapping frames.

Conveniently, the processor calculates the illumination gain coefficients so that an average illumination gain coefficient is one.

Conveniently, the processor calculates inter-frame and intra-frame gain coefficients by solving a non-linear set of equations.

Conveniently, the processor compensates in response to statistics of aerial intensity values within selected areas of the patterned article, a selected area being much larger than a sub-area in which values of the intensity correlate.

Conveniently, the interface receives data representative of multiple aerial images of the at least portion; different aerial images are acquired under different focal conditions; and the processor processes the data to determine variations of the parameter of the feature.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Methods and devices for evaluating variations of a feature (such as but not limited its critical dimension) of a patterned article are provided. The evaluation can provide an indication about variations of a parameter of a pattern (periodical or non-periodical) that includes one or more instances of the feature.

Conveniently, the patterned article is used to produce another article. This other article can include multiple instances of a so-called other feature. In this case the evaluation can include determining a variation of a parameter of the other feature. The patterned article can be a lithographic mask while the other article can be a wafer.

The method and devices described herein enable one to measure variations of features that can be spread over an entire lithographic mask. Conveniently, a feature variation map of the entire patterned article can be provided. The size of feature variation map pixels can be defined such as to provide a satisfactory compromise between feature variation map sensitivity and repeatability.

Conveniently, an aerial image (or data representative of this image) of the patterned article (or at least a portion of the patterned article) is generated by acquiring multiple frames. Aerial intensity values acquired from overlap areas between the multiple frames can be used for compensating inter-frame illumination variations and intra-frame illumination variations (also referred to as FOV variations). Inter-frame illumination variations represent variations in an intensity of a radiation source (such as a laser, a broadband radiation source and the like) during an acquisition of the different frames. Intra-frame illumination variations represents illumination (and optionally image acquisition) inhomogeneity within a single frame.

Conveniently, the evaluation of the variation of the feature can be executed during a defect detection session of the patterned article. Alternatively, at least a calculation of values of a functional of an aerial image intensity for each selected region of the patterned article is executed during a defect detection session. Conveniently, the evaluation or at least the calculations are completed during a single scan of the patterned article.

According to an embodiment of the invention, the evaluation can require a simple setup and no there is no need for using a complicated recipe. The setup conveniently includes selecting which feature to evaluate and which parameter to calculate. A simple recipe can enable one to execute various methods illustrated below.

By using a relationship between aerial intensity values and parameters of a feature, and especially by comparing aerial intensity values obtained from different frames or different sub-frames, a highly accurate evaluation of the variation of the feature can be provided.

Yet according to another embodiment of the invention, multiple aerial images of a patterned article (or at least a portion thereof) are acquired under different focal conditions. Data representative of these images can be processed in order to evaluate variations of the feature and even to enable process window analysis.

Conveniently, evaluated variation of the parameter (such as critical dimension) can be used for various purposes and by various devices or algorithms, such as but not limited to: (i) providing a qualification criteria for a mask to be shipped out of a mask shop; (ii) mask generation process monitoring; (iii) input to a feature variation compensation (or reduction) equipment; (iv) input to a mask model used in lithographic simulations; (v) provide correction maps for a lithography stepper; and (vi) identify areas that are characterized by a larger than expected feature parameter variation.

The data can be generated by an aerial image scanner system, such as the AREA 193 of Applied Materials Inc. from Santa Clara, Calif. More specifically, the present invention is used for the inspection of masks of a kind used in the semiconductor industry, and is therefore described below with respect to this application.

Figure 1:
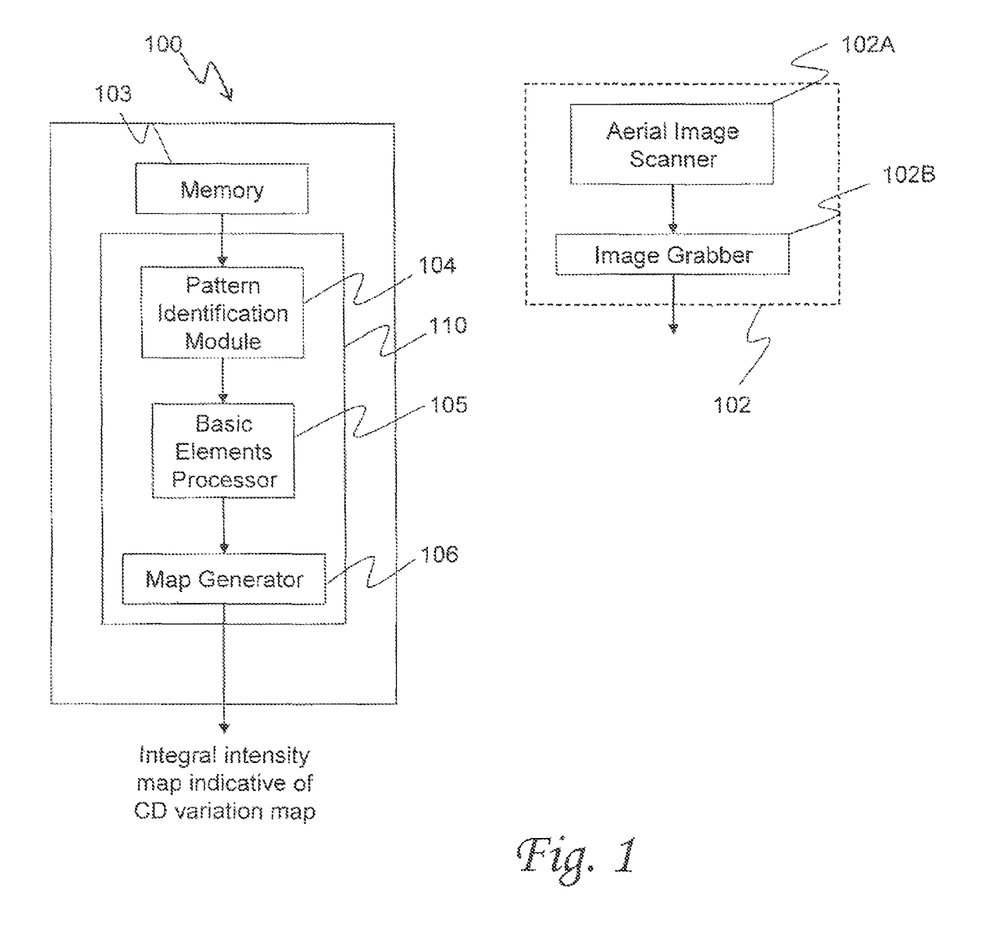
FIG. 1 is a block diagram of an example of a monitoring system of the present invention for mapping one or more parameters of a pattern in a patterned article.

Reference is made to FIG. 1 schematically showing, by way of a block diagram, an example of system 100 according to an embodiment of the invention.

System 100 can be associated with an aerial image scanner (AIS) system 102 (such as the AREA 193). The system 100 may be configured as a stand alone unit receiving or exchanging data with the AIS system 102, or may be integral with the AIS system 102. The AIS system 102 is configured and operable to generate and grab (acquire) the aerial image of a mask during regular mask inspection, and typically includes an aerial image scanning module 102A and an image grabber 102B.

In some embodiments of the invention, the AIS system 102 operating with its typical scanning mode is used. In some other embodiments of the invention the AIS system 102 (particularly its scanner unit 102A) is operated according to the invention to provide an overlapping scanning, as will be described further below.

Conveniently, AIS system 102 can acquire multiple images of the mask, each at a different focal condition. These different images can be acquired concurrently or in a serial manner.

The monitoring system 100 is configured as a computer system including inter alia a memory utility 103 for storing inter alia certain reference data, and a processor 110. The processor 110 is configured and operable for receiving and processing data indicative of an aerial image (received from the AIS system 102) of at least a portion of the mask and determining a functional of the aerial image intensity for selected regions of the mask. Processor 110 can evaluate variations of a parameter (such as CD) of multiple instances of a certain feature that are included within selected regions of the mask.

The regions can be selected in various manners. Conveniently, all selected regions have the same shape and size and include a periodic or non-periodic pattern that includes one or more instances of the feature. Regions of masks that are used to produce memory arrays usually include only (or mostly) periodical patterns.

Processor 110 is also adapted to generate a feature variation map. Sample feature variation maps are illustrated in FIGS. 3B, 3C, 4B and 4C. It is noted that these maps were generated by calculating a functional that was an integral of aerial intensity values of each region. Accordingly, these maps are also referred to as integral intensity maps. It is noted that the functional can differ from an integral.

It is noted that processor 110 can also generate a feature variation map and/or evaluate a variation of a parameter of a feature within selected regions that form only a portion of the whole mask. Nevertheless, for simplicity of explanation most of the following explanations will refer to an entire mask.

As shown in the example of FIG. 1A, processor 110 includes a features identifier module (also referred to as a "pattern identification module") 104, a so-called region processor (also referred to as a "basic elements processor") 105, and feature variation map generator (also referred to as a "map generator") 106.

Feature identifier 104 is adapted to receive, from the AIS system 102 (particularly its image grabber 102B), measured data indicative of the aerial image and process this data by an appropriate feature recognition algorithm. This can be implemented using reference data indicative of a predetermined reference feature (or pattern). Feature identifier module 104 operates as a matcher utility to identify and mark, in the aerial image of the mask, all the locations of the various instances of the feature (or of a pattern that includes multiple features).

The so-created pattern identification data is transferred to the region processor 105. Region processor 105 is configured and operable to divide the aerial image into regions (windows) and to select selected regions. As indicated above the selection can be responsive to the location of instances of the feature. Conveniently, all the regions have the same shape and size although this is not necessarily so. Using regions of different sizes can require size changes compensation.

Region processor 105 can also calculate, for each selected region, a value of the functional of that selected region.

Data indicative of the values of these functionals (as well as the associated selected regions) are sent to feature variation map generator 106. Feature variation map generator 106 produces a feature variation map. It is noted that the feature variation map can include multiple feature variation map pixels. Each pixel can correspond to a selected region, but this is not necessarily so. Each pixel can represent multiple aerial intensity values. The size of these pixels can be selected. Larger pixels reduce the resolution of the feature variation map but on the other hand increase the accuracy and/or robustness of the feature variation map. Typically, the size of these pixels equals the size of the selected regions. Accordingly, the selection of the size of the selected regions determines the resolution of the feature variation map.

It is noted that the feature variation map can provide a relative indication about the variations of the parameter of the feature. Thus, one region can be compared to another and a relative indication of the variations of the features are provided.

By recognizing that for dense patterns the intensity integral over a region of the aerial image is linearly proportional to critical dimensions (CD) of that dense pattern, a CD variation map is generated. Indeed, for a very dense pattern (such as the systematic variations in CD of a mask) that includes a periodical arrangement of oblique and transparent lines, having a line width W and pitch P, the aerial image intensity can be approximated by the following:

$$I(x) = I_0\left(\frac{W}{P} + \frac{2MTF}{\pi}\sin\left(\frac{\pi W}{P}\right)\cos\left(\frac{2\pi x}{P}\right)\right)$$

In the mentioned above equation $I_0$ is the illumination intensity and MTF is the modulation transfer function. In this specific but not limiting example, circular illumination is considered (i.e. a substantially circular cross section of a light beam at the output of the light source unit). Then, the so-obtained aerial intensity values are summed and averaged. It should be understood that summing the intensity values is an example of processing suitable to be used in the invention, however the invention is not limited to this specific example, and alternatively, such procedures as standard deviation (STD) or summing of an intensity value gradient can be used.

Summing the intensity over an interval such as a dense pattern of length X provides:

$$\overline{I(x)} = \frac{1}{X}\int_0^X I_0\left(\frac{W}{P} + \frac{2MTF}{\pi}\sin\left(\frac{\pi W}{P}\right)\cos\left(\frac{2\pi x}{P}\right)\right)dx$$

When X is much larger than P we obtain:

$$\overline{I(x)} = I_0\frac{W}{P}$$

Thus, for a given illumination intensity the integral of aerial intensity values over an aerial image of a selected region is linearly proportional to the CD variation of this pattern. Therefore the CD variation map can be easily inferred from the intensity integral map.

Figure 2:
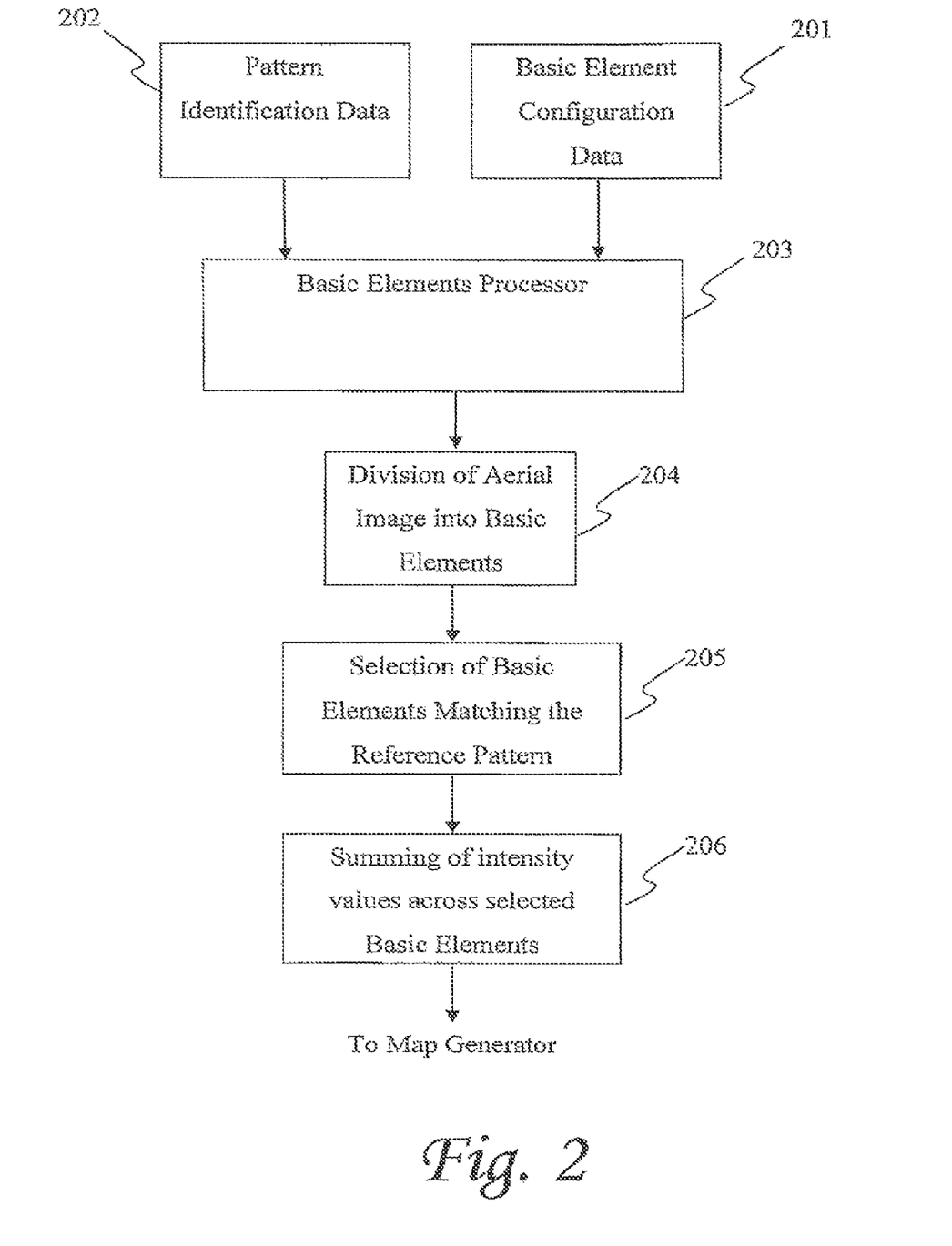
FIG. 2 is a block diagram representing the functioning of the basic elements of a processor suitable to be used in the system of FIG. 1.

The configuration and operation of region processor 105 is exemplified in FIG. 2. Region processor 105 includes a data divider utility 204, a summing utility 206, and preferably also a matcher utility 205.

Divider utility 204 utilizes region configuration data 201 (reference data) which defines the configuration (at least the size) of a region. Image divider utility 204 is preprogrammed to divide the aerial image into regions. It is noted that the aerial image of an entire mask can include multiple frames. The aerial image or each frame can be divided into regions of a few microns or a few sub-microns each.

A region has an appropriate configuration, preferably including an integer number of periods of a repetitive pattern. For example, the dividing may be performed using data indicative of a grid containing a plurality of elemental areas.

Matcher utility 205 utilizes pattern identification data to select, in the region, locations corresponding to the reference feature or pattern. The data output from the matcher utility 205 is then processed by the summing utility 206, which sums, for each region, the aerial intensity values. Yet according to an embodiment of the invention summing utility 206 sums aerial intensity values of sub-regions that include the reference pattern.

It should be noted that the invented technique is not limited just to the measurement of aerial intensity averaged over large areas. Every measurement carried out on a few discrete locations can be used (with little modifications) in the invention on large areas covering the whole mask. For example, putting a threshold on a certain gray-level and counting all pixels exceeding this threshold (over some area) can be used. Areas containing a greater number of such pixels probably suffer from CD variation problems (correlated to the direction of change—more pixels means larger CD). Another example might be the measurement of an average distance between the centers of all adjacent contacts (constituting a pattern feature) in a certain area. This measurement will show the stability of the periodic pattern (contacts in this case) over the whole map.

Reference is now made to FIGS. 3A-3C and FIGS. 4A-4C showing two examples, respectively, for the specific lithography masks' layout, and their respective intensity integral map and relative intensity integral map obtained using the above-described technique of the present invention.

Figure 3A:
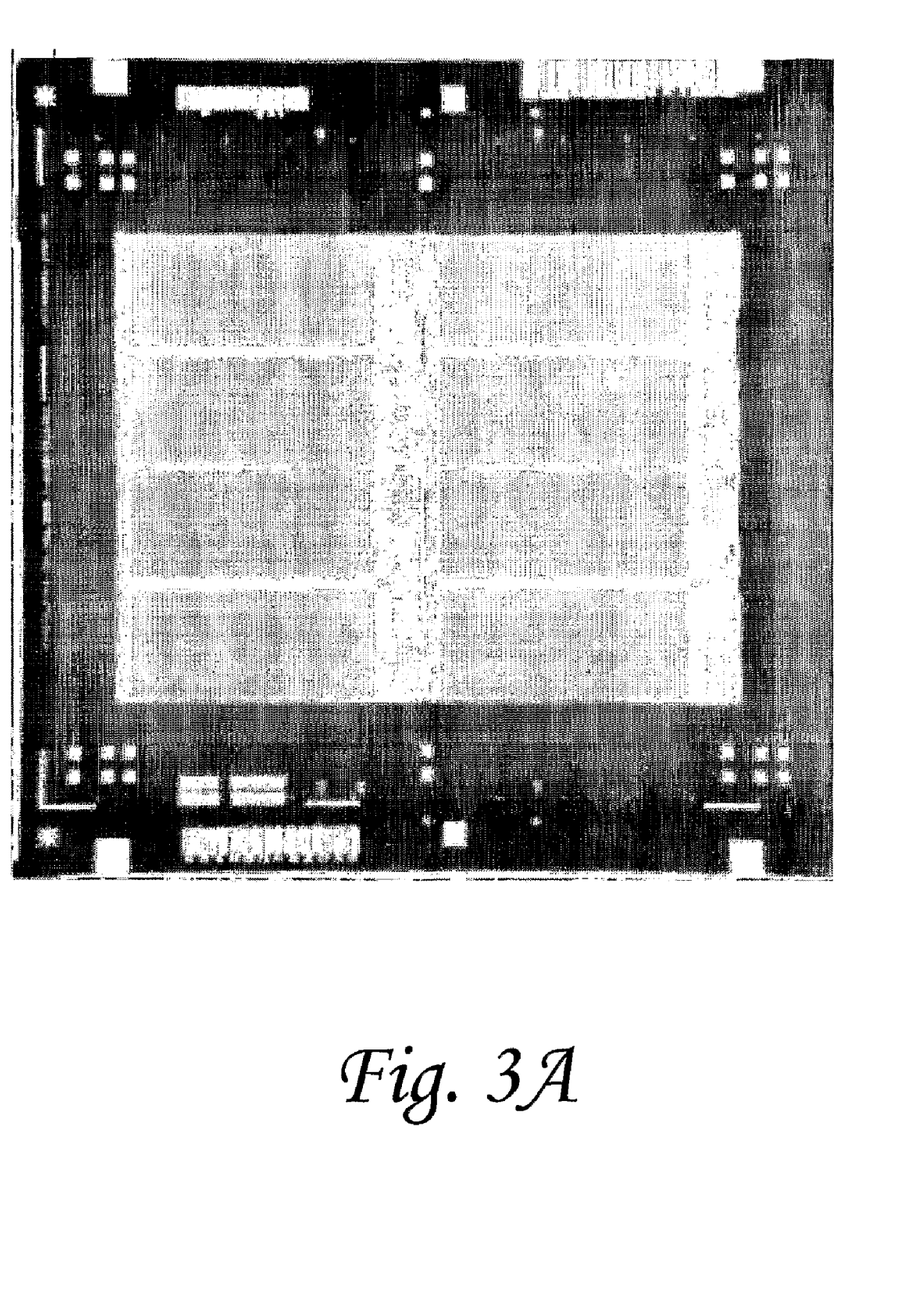
FIGS. 3A to 3C exemplify, respectively, an image of the layout of a specific lithographic mask, and its corresponding intensity integral map and a relative intensity integral map obtained by the technique of the present invention.
Figure 3B:
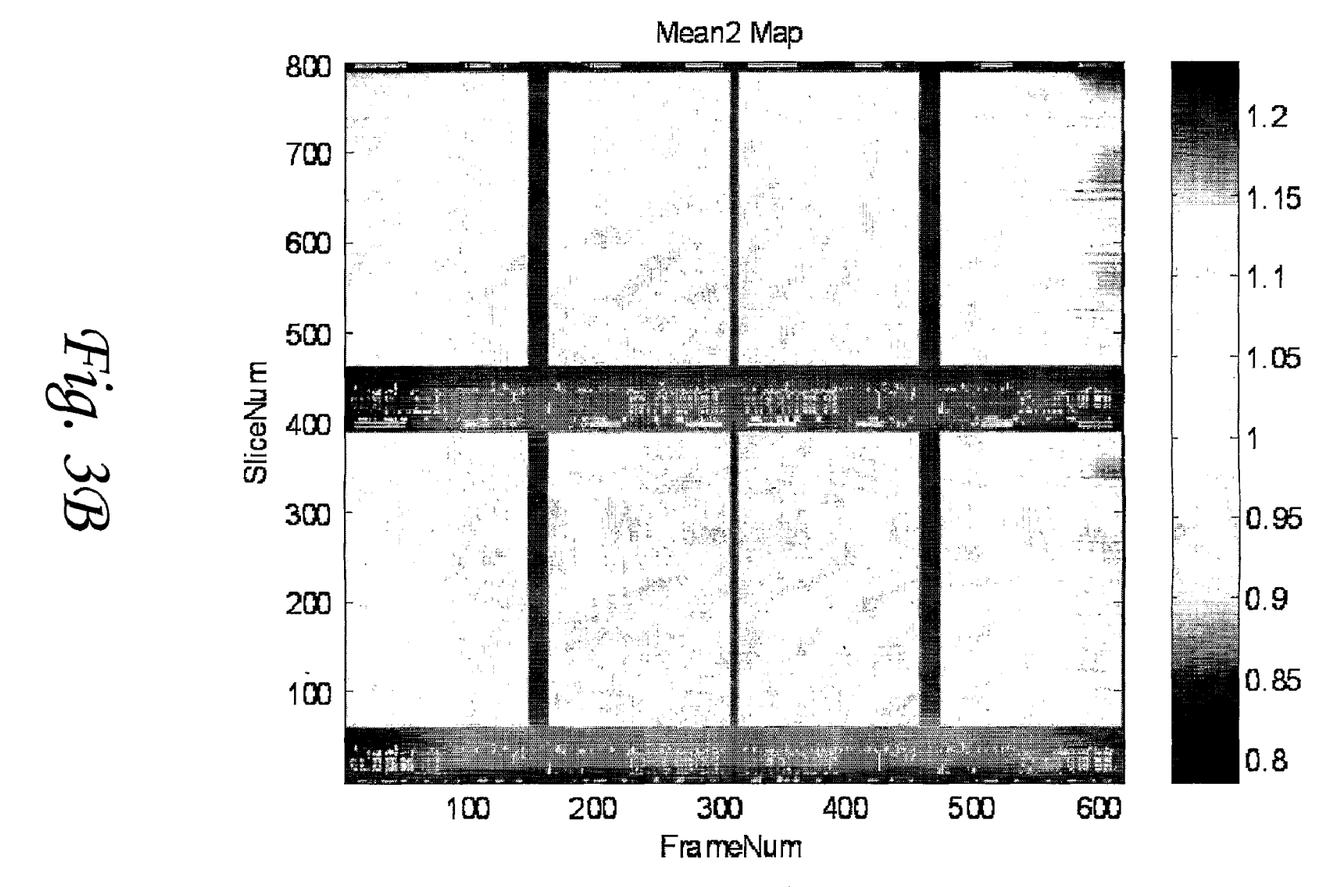
Figure 3C:
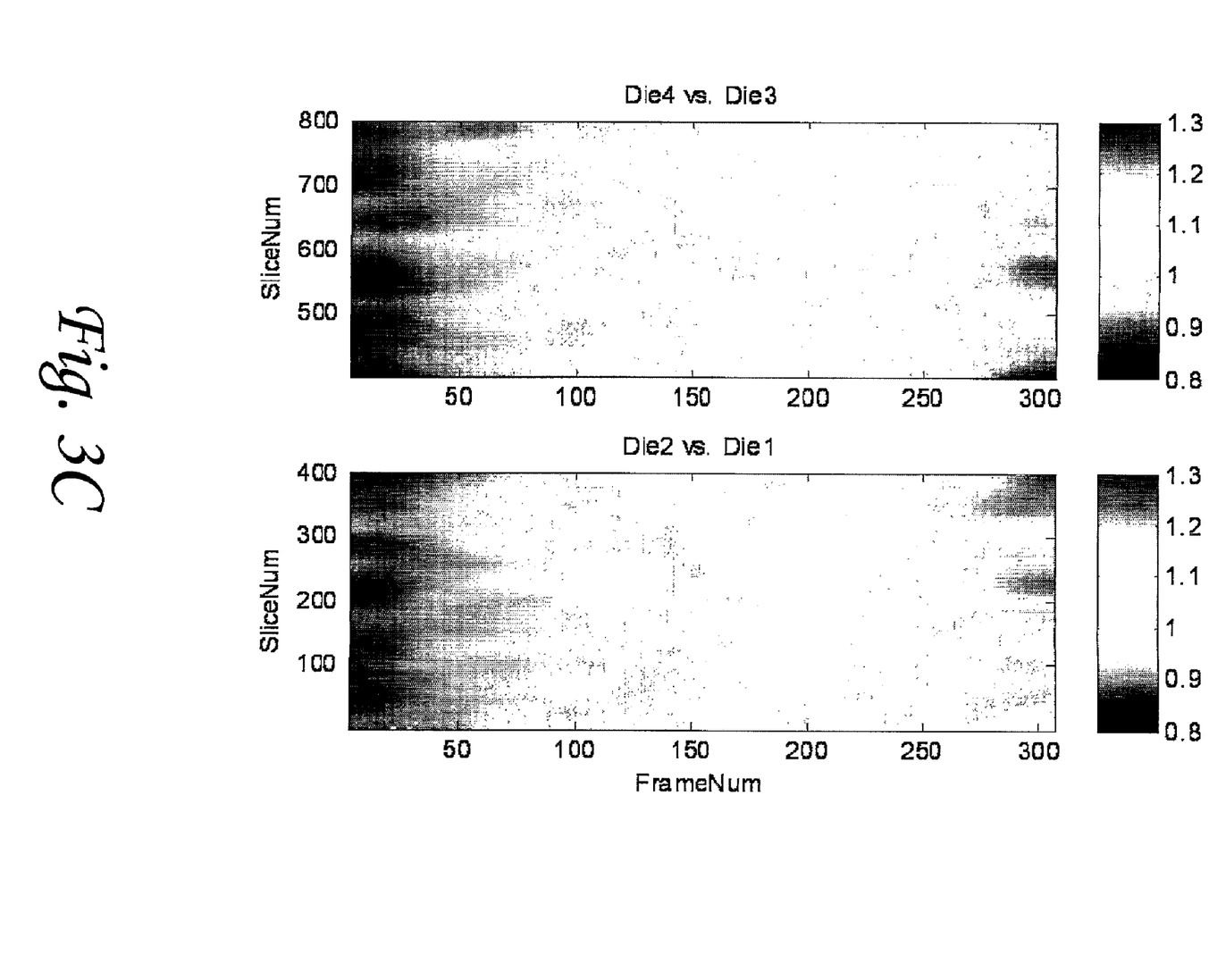

FIG. 3A shows the layout of lithographic mask SM736, which was obtained using an optical imaging system with a numerical aperture of 0.9 and annular pupil filling 6 of 0.92/0.69. FIG. 3B shows the intensity integral map of the same lithographic mask produced using the current invention. The overall mask structure is identical in both of these figures showing an array of 8 cells. However whereas in the microscopic image of FIG. 3A these cells appear substantially flat and uniform, the intensity integral map of FIG. 3B reveals an intensity variation which is indicative of the corresponding variation in the critical dimensions of cells' patterns. These intensity variations are more pronounced when viewed in a relative intensity map for two pairs of dies shown in FIG. 3C.

Figure 4A:
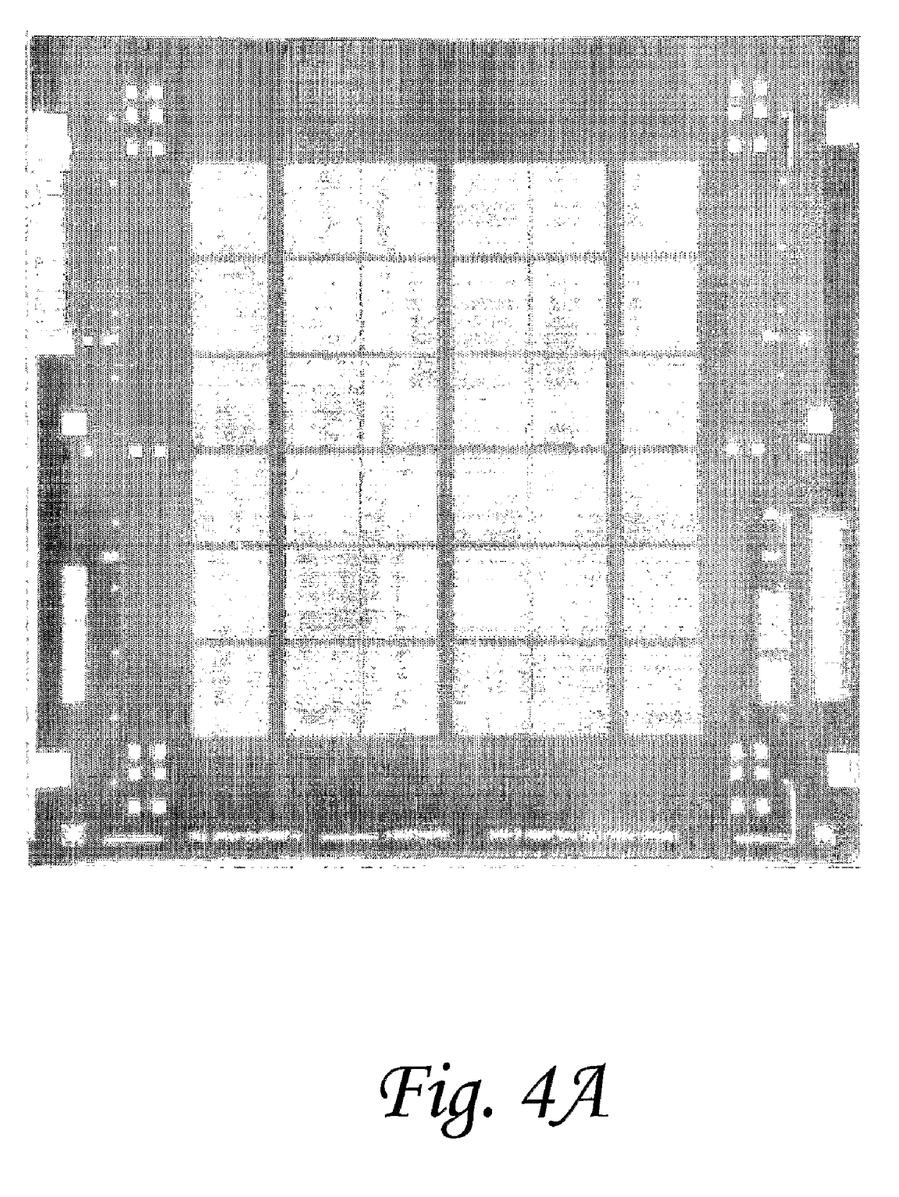
FIGS. 4A to 4C exemplify, respectively, an image of the layout of another lithographic mask, and its corresponding intensity integral map and relative intensity integral map.
Figure 4B:
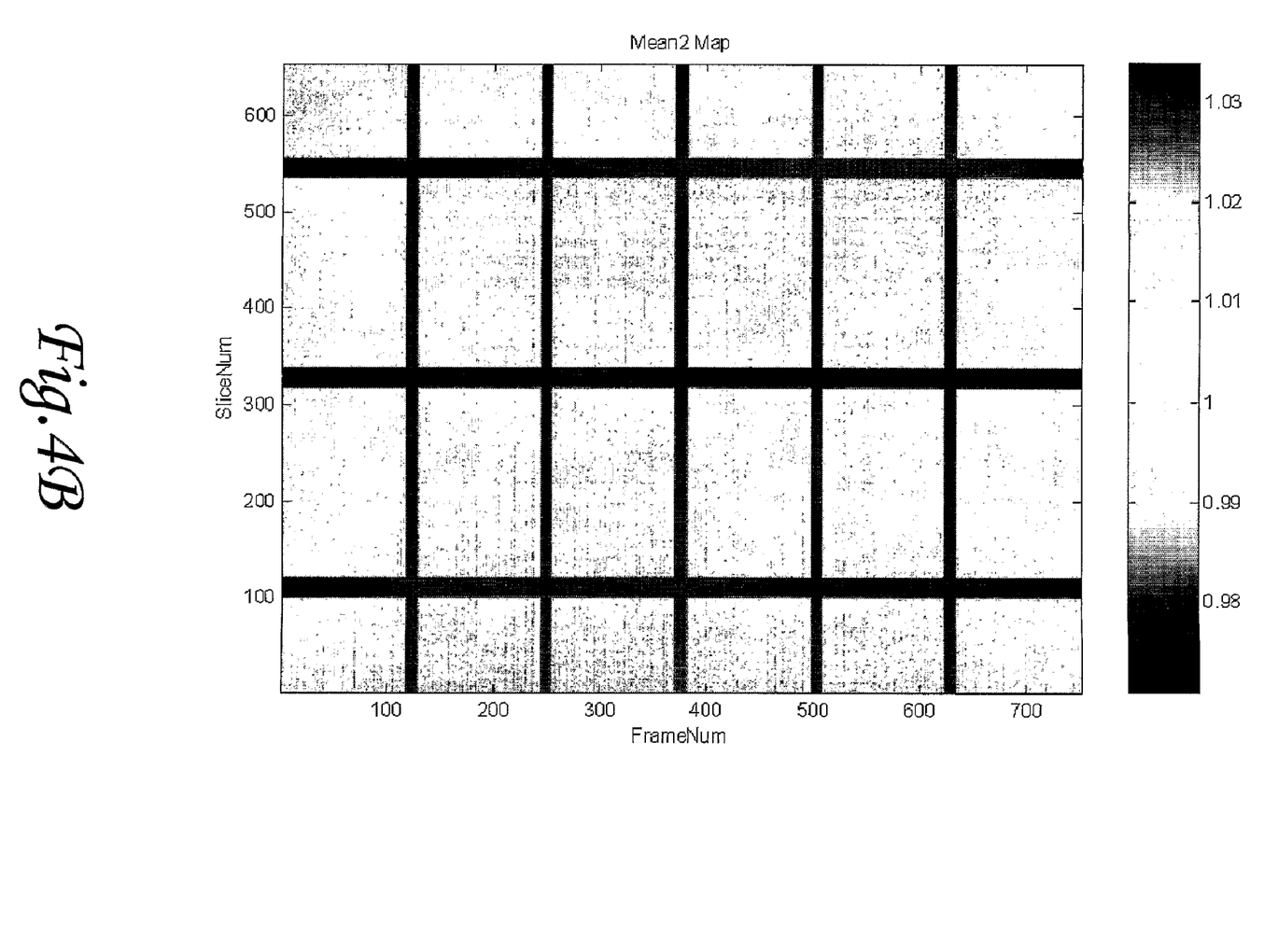
Figure 4C:
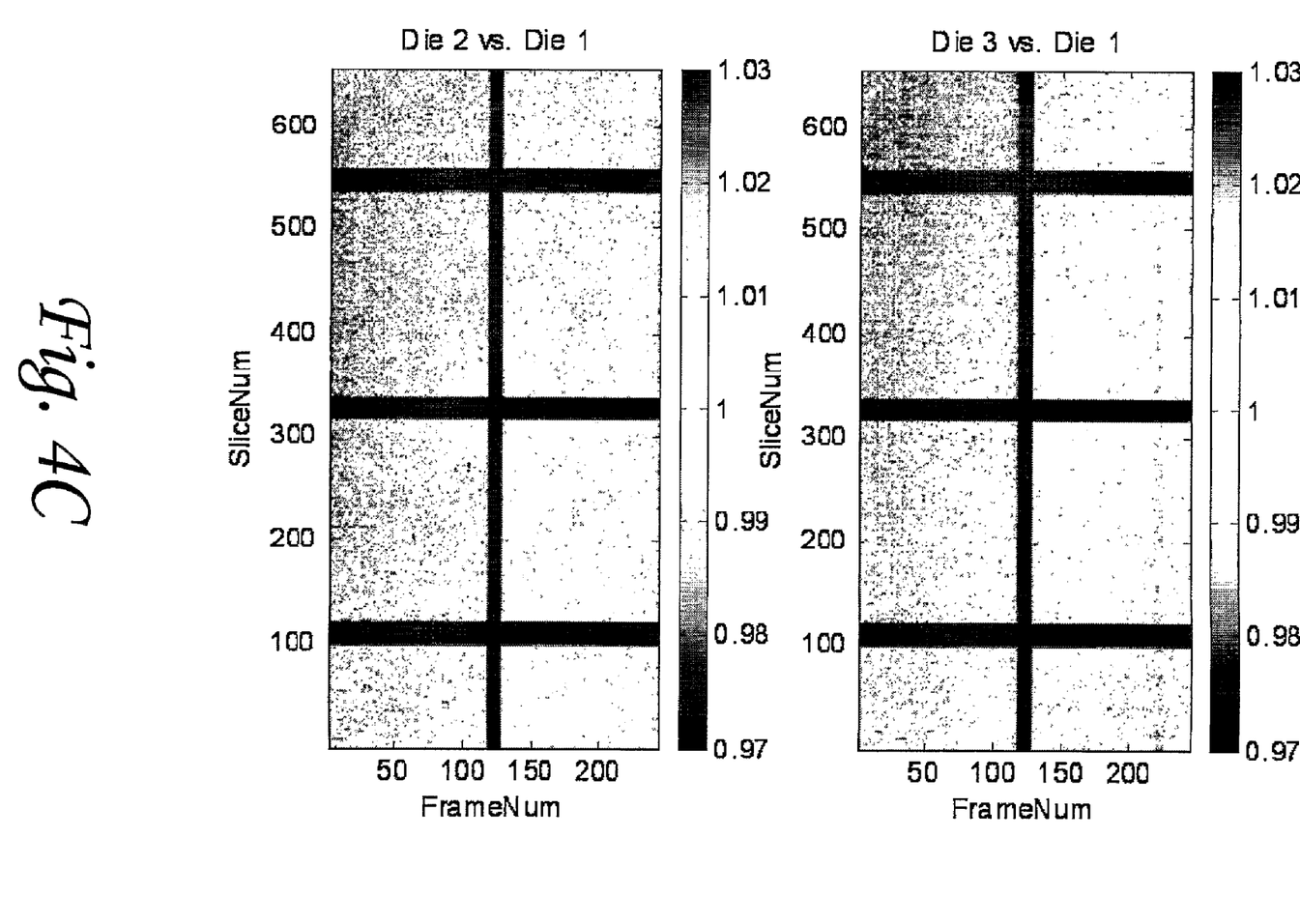

FIG. 4A shows an image of the layout of lithography mask SF314 containing an array of 24 cells, obtained with an optical imaging system with a numerical aperture of 0.8 and annular pupil filling σ of 0.85/0/55. FIG. 4B shows the intensity integral map of this mask, and FIG. 4C shows the relative intensity integral map.

System 100 may be used concurrently with regular mask inspection. In other words, AIS system 102 may operate to inspect the mask for defects, while concurrently transmitting initial image data (from the image grabber) to the mapping system 100. The mapping system, as being configured as a computer system, may be a constructional part of a control unit of the AIS system. The mapping system may be adapted to be used as qualification criteria determining whether a mask is to be shipped out of the mask shop. Similarly, the map can be used as a monitor improving the mask production process or to provide an input for a compensating mechanism provided to reduce the variations in the critical dimensions. For example, the output data of the mapping system may be used to attenuate the illumination of some regions of the mask so as to reduce variations in the critical dimensions.

As indicated above, the system of the present invention is preferably configured to compensate for the measurement error associated with the AIS system variations, such as inter-frame variations and intra-frame variations. Inter-frame variations can result from changes of the intensity of illuminating radiation source (such as laser or a broadband source) during the scan of an entire mask (or a scan of a large enough portion of a patterned article). Intra-frame variations (also referred to as Field Of View (FOV) variations) represent brightness inhomogeneity within a single FOV of AIS system 102.

Figure 5:
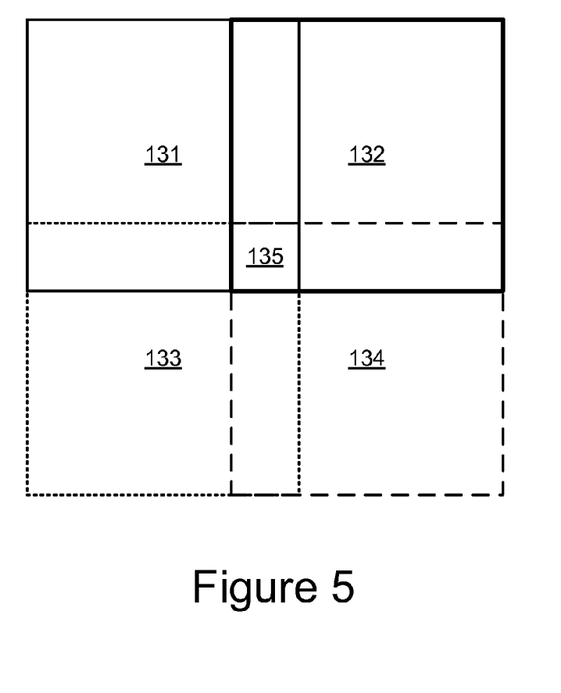
FIG. 5 schematically illustrates the principles of the embodiments of the invention aimed at compensating for the measurement error associated with the aerial image scanner (AIS) system variations, such as the laser intensity variations and/or the Field Of View (FOV) variations.

Conveniently, variations are compensated by defining overlap areas that are shared by partially overlapping frames. In this connection, reference is made to FIG. 5 showing the principles underlying this technique.

Four partially overlapping frames 131-134 define overlap area 135 that is included within each of these square-shaped frames. If, for example, overlapping area 135 is equivalent to a quarter of each of the overlapping areas, then intra-frame variation compensation can be applied by comparing aerial intensities of pixels (frame pixels) within the overlap area 135.

Conveniently, inter-frame variation compensation can be performed while taking into account that aerial intensities of pixels within the overlap area and even a value of a functional of the functional of an aerial image intensity for the overlap area should be the same.

Turning back to FIG. 1, to this end, AIS system 102 is appropriately operated, either by an operator utility (now shown) of the monitoring system 100 or by a separate controller associated with the AIS system.

Generally, the measured data (data representative of the aerial image) that is generated by AIS system 102 and being input to system 100 is in the form of a grid of N×M frames. N and M are positive integers. System 100 operates to divide each frame into U×V square sub-frames, and to average the gray level of each sub-frame to provide U×V integral (functional) measurements. At least one row and column of the measured data matrix are overlapped by multiple adjacent frames.

The model to be used may be as follows:

$$s_{m,n,u,v} = l_{m,n,u,v} g_{m,n} f_{u,v}$$

Where $s_{m,n,u,v}$ is the "true" intensity integral value; $l_{m,n,u,v}$ is the intensity integral measure at sub-frame u,v of frame m,n; $g_{m,n}$ is the illumination gain coefficient of frame m,n; $f_{u,v}$ is the intra-frame coefficient of sub-frames u,v.

Figure 6:
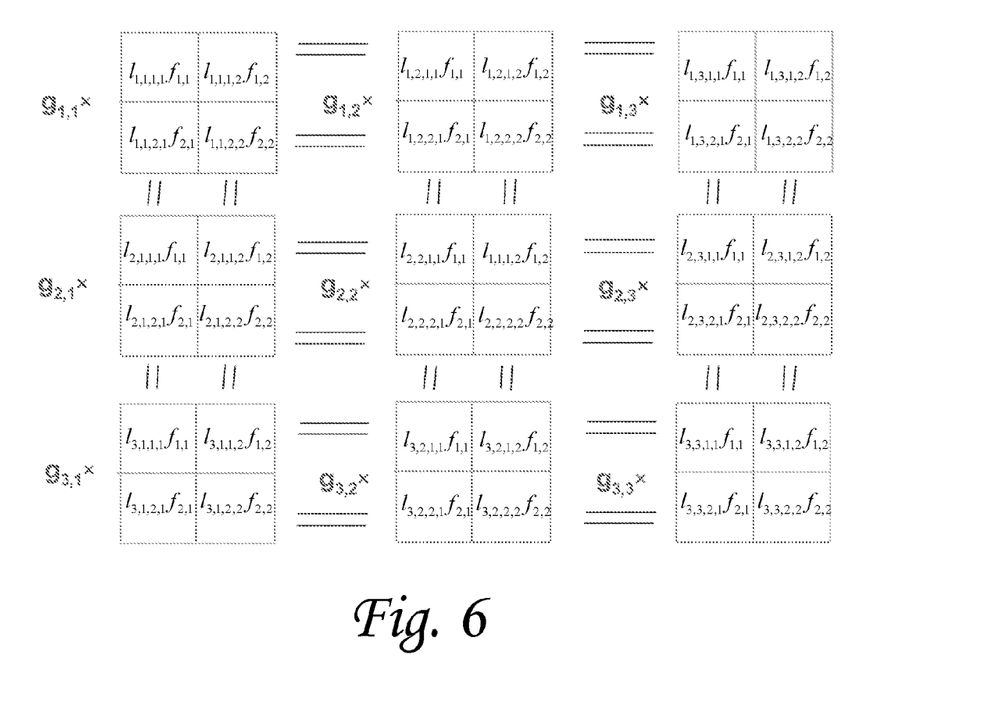
FIG. 6 exemplifies the principles of FIG. 5 for obtaining data for a 3×3 frame matrix.

FIG. 6 exemplifies in a self-explanatory manner the so-obtained data from 3×3 frame matrix. It is also assumed (for simplicity of explanation) that the radiation source is a laser.

According to the invention, the illumination gain coefficients (also referred to as laser intensity correction values) g are selected such that the sum for all the intensity differences between the overlapping frames is minimal.

The compensation for intra-frame variations, which are the consistent bias of the CD measurements as a function of their placement in the frame and may be caused by brightness inhomogeneity, can be carried out based on the assumption that these variations are constant for all the frames. In this case, these variations can be calculated using one of the following: (1) partitioning each frame to multiple sub-frames; calculating intra-frame coefficients (a U×V matrix) and averaging aerial intensity values for sub-frames positioned at the same location within different frames, or (2) calculating intra-frame and inter-frame together. The latter can involve solving non-linear equations or a non-linear set of equations.

In yet another example, it is assumed that intra-frame variations are already compensated. For each sub-frame that is overlapped between multiple frames, its true CD measurement, which is known, should be the same in each of these multiple frames. Since this gives more constraints than needed, and since the CD measurement ought to have some error even after the intra-frame and inter-frame variations have been minimized, a regression algorithm is applied using all these constraints.

Let us suppose than there are C instances of two frames overlapping the same sub frames. The c'th couple of overlapping sub-frames is denoted by $s_{m_c^1, n_c^1, u_c^1, v_c^1}$ and $s_{m_c^2, n_c^2, u_c^2, v_c^2}$.

An error function E is denoted as:

$$E = \sum_{c=1}^{C} \left( s_{m_c^1, n_c^1, u_c^1, v_c^1} - s_{m_c^2, n_c^2, u_c^2, v_c^2} \right)^2$$

This error function is minimized with respect to $g_{1,1}, \ldots, g_{m,n}$ under the constraint:

$$G = \sum_{m=1}^{M} \sum_{n=1}^{N} g_{m,n} - \sum_{m=1}^{M} \sum_{n=1}^{N} 1 = 0$$

This constraint is required in order to make the solution single, and scales the solution so that the average laser intensity correction is one.

Minimizing the error function under the constraint G=0 is carried out using Lagrange multipliers, and results in a linear system.

In yet a further example, it is assumed that both inter-frame variations and intra-frame variations are compensated together. Since minimizing the mentioned above error function with respect to both $g_{1,1}, \ldots, g_{m,n}$ and $f_{1,1}, \ldots, f_{m,n}$ results in a non-linear system, a log of all the intensity values is taken. A model for the CD is $$\tilde{S}_{m,n,u,v} = \tilde{l}_{m,n,u,v} + \tilde{g}_{m,n} + \tilde{f}_{u,v}$$

where $\tilde{S}_{m,n,u,v} = \log(S_{m,n,u,v})$, etc.

The Error function E' is now defined as:

$$E' = \sum_{c=1}^{C} \left( \tilde{s}_{m_c^1, n_c^1, u_c^1, v_c^1} - \tilde{s}_{m_c^2, n_c^2, u_c^2, v_c^2} \right) + \lambda \sum_{m=1}^{M} \sum_{n=1}^{N} g_{m,n}^2 + \delta \sum_{u=1}^{U} \sum_{v=1}^{V} f_{m,n}^2$$

where $\lambda$ and $\delta$ are constants.

Error function E' is minimized with respect to both $g_{1,1}, \ldots, g_{m,n}$ and $f_{1,1}, \ldots, f_{m,n}$.

The above-described technique can be extended for large mask areas, as follows: As the constraints on the laser intensity variations are all small, errors in their assessment can accumulate to large errors over large distances. Thus the corrected CD measurement might "drift" when applying this technique on areas in a scale of the whole mask. In order to avoid this problem, when operating on large mask areas, more global constraints are added.

Our additional constraint concerns the statistical behavior of the laser intensity variations. It can be assumed that the laser intensity values have very small correlations over a long enough period of time, so that over a large-enough area they average to one. Conveniently, the aerial image is divided into square areas (typically in the order of 10×10 frames), possibly with overlaps. Then, for each square, the squared deviation of its mean laser intensity value from one to the error function is added.

Formally, K squares of frames are defined, each containing P frames. This defines K groups of laser intensity values, each with P members:

$$\{g_{m_p^k, n_p^k} | 1 \leq p \leq P\} \; k = 1 \ldots K$$

According to the above-described option 1, the new error function E" is:

$$E'' = \sum_{c=1}^{C} \left( s_{m_c^1, n_c^1, u_c^1, v_c^1} - s_{m_c^2, n_c^2, u_c^2, v_c^2} \right) + \alpha \sum_{k=1}^{K} \left( \frac{1}{P} \sum_{i=p}^{P} g_{m_p^k, n_p^k} - 1 \right)^2$$

where $\alpha > 0$ is some constant.

The technique of the invention can be generalized for wafer related data, to be easily applied on wafers or any other frame data series. The main goal is to obtain a highly accurate measurement by averaging statistical information and avoiding machine data variation (by overlapping the grabbed data as described above).

Also, the invented technique can be extended to any kind of measurement on a particular pattern (or structure). In other words, the invention can be used for producing a global map (i.e., the whole mask map) of a certain measurement for a particular feature or pattern, for example, generating a map of the line-end shortening measurement on a line and space pattern. The identification of the pattern (or feature) can be performed by using database and matching algorithms (such as match filter), which were developed specially for the pattern behavior. For each scanned frame, the algorithm identifies the pattern within the frame and determines the required data.

Generally, the technique of the invention allows a user to select (manually, from the database) some particular features, and the algorithm will generate per each feature a global map. In this case, the measurements are rather general without any connection to the feature, such as the average intensity, the contour length, etc.

The global map is generated as follow: a user selects a pattern (structure) using the mask database. The patterns are kept in a compressed hierarchical database (such as Kd-tree). The control unit (algorithm) calibrates the patterns measurements (average intensity, contour length etc.) over the FOV, similar to the above-described FOV calibration. During scanning, the selected patterns are identified via the database (reference data) and measurements are performed on the scanned image. The identification is performed by using approximated nearest neighbor search methods.

The above-described methods (i.e. measurements on particular pattern, and the user defined pattern) for measuring on non-periodic patterns explain how to generate a single (feature/pattern/structure) measurement. For generation of a map for the whole mask, some data-processing (mainly averaging) needs to be performed over the single measurements, similar to the periodic-pattern method. The amount of averaging depends on the area that a single map pixel represents.

Figure 7:
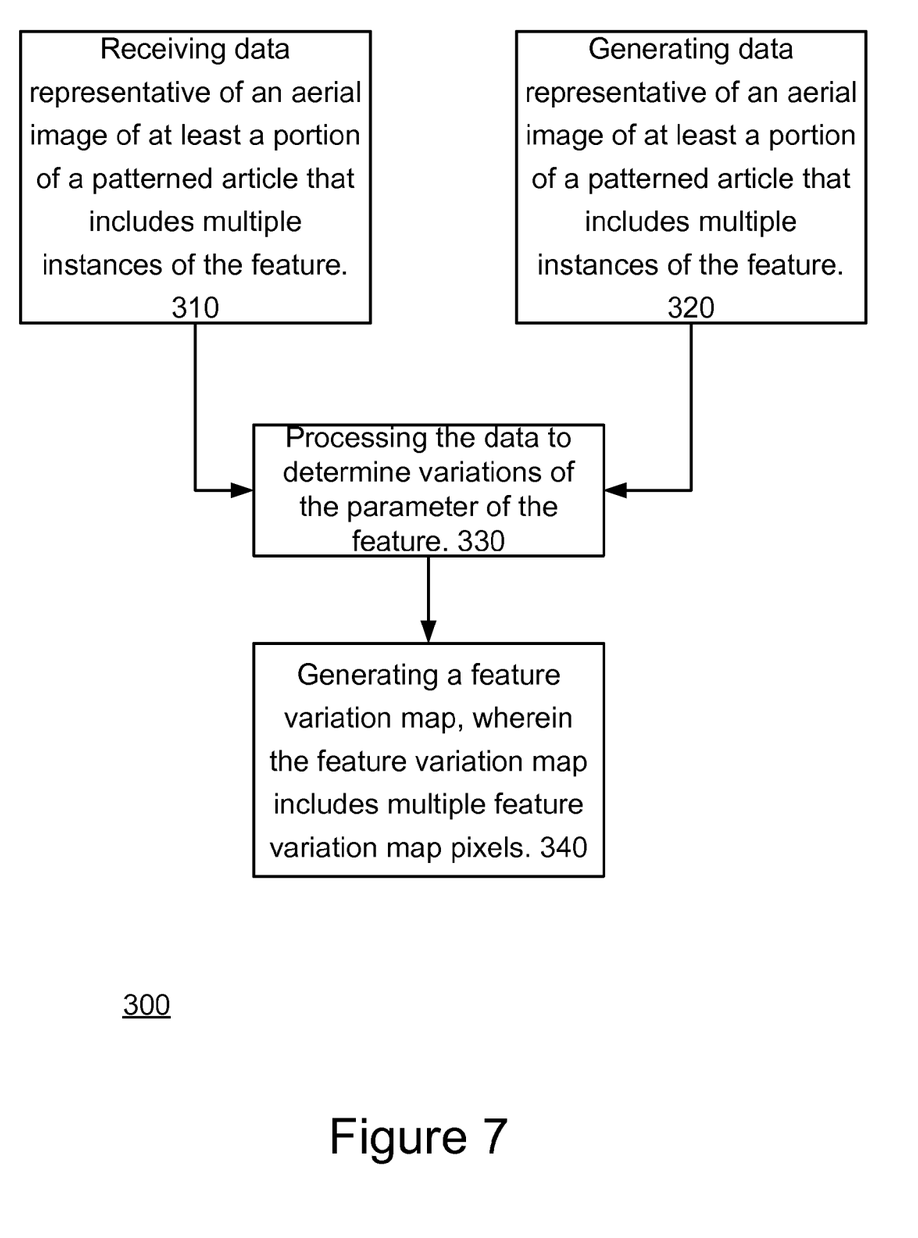
FIG. 7 is a flow chart of a method for evaluating a parameter of a feature, according to an embodiment of the invention.

FIG. 7 is a flow chart of method 300 for evaluating a parameter of a feature, according to an embodiment of the invention.

Method 300 starts by either one of stages 310 or 320.

Stage 310 includes receiving data representative of an aerial image of at least a portion of a patterned article that includes multiple instances of the feature. It is noted that the data can represent a whole mask.

Stage 320 includes generating data representative of an aerial image of at least a portion of a patterned article that includes multiple instances of the feature. It is noted that the data can represent a whole mask.

Stages 310 and 320 are followed by stage 330 of processing the data to determine variations of the parameter of the feature.

Conveniently, stage 330 includes at least one of the following stages or a combination thereof: (i) calculating a value of a functional of an aerial image intensity for each selected region of the patterned article; (ii) determining variations of at least one another feature that is manufactured by utilizing the patterned article; and (iii) comparing between functional values associated with different selected regions.

According to an embodiment of the invention stage 310 may include receiving data representative of multiple different frames. Stage 320 may include generating data representative of multiple different frames. In these cases, stage 330 of processing includes compensating for differences in a generation of the different frames.

The compensating can include at least one of the following stages or a combination thereof: (i) compensating for inter-frame illumination variations; (ii) compensating for intra-frame variations; (iii) partitioning each frame to multiple sub-frames; calculating intra-frame coefficients by averaging aerial intensity values for sub-frames positioned at the same location within different frames; (iv) receiving information representative of aerial intensities of multiple partially overlapping frame images; and determining a difference in an acquisition of each of the multiple partially overlapping frame images in response to a difference between different representations of an overlap area in each of the partially overlapping frame images; (iv) calculating illumination gain coefficients such as to minimize differences between representations of overlap areas of partially overlapping frames; (v) calculating the illumination gain coefficients so that an average illumination gain coefficient is one; (vi) calculating inter-frame and intra-frame gain coefficients by solving a non-linear set of equations; (vii) compensating in response to statistics of aerial intensity values within selected areas of the patterned article, wherein a selected area is much larger than a sub-area in which values of the intensity correlate.

Conveniently, each selected region includes a periodical pattern that includes multiple features that are arranged in a periodical manner; and stage 330 includes calculating an aerial image intensity integral.

Conveniently, stage 330 is followed by stage 340 of generating a feature variation map, wherein the feature variation map includes multiple feature variation map pixels. It is noted that stage 340 can be preceded by a stage (not shown) of determining a size of the feature variation map pixel.

Conveniently, each selected region includes a non-periodic pattern that includes the feature and method 300 includes a stage (not shown) of selecting the selected regions by applying to aerial image data a pattern recognition algorithm.

According to a further embodiment of the invention stage 310 can include receiving data representative of multiple aerial images of at least a portion of the patterned article, wherein different aerial images were acquired at different focal conditions. Stage 320 can include generating data representative of multiple aerial images of at least a portion of the patterned article, wherein different aerial images were acquired at different focal conditions. In this case stage 330 can include processing the data to determine variations of the parameter of the feature.

Those skilled in the art will readily appreciate that various modifications and changes can be applied to the embodiments of the invention as hereinbefore described without departing from its scope defined in and by the appended claims.

We claim:

1. A method for evaluating a variation of a parameter of a feature, the method comprising:
   receiving data representative of an aerial image of at least a portion of a patterned article that comprises multiple instances of the feature, the aerial image including multiple different frames; and
   processing the data to determine variations of the parameter of the feature, wherein the processing comprises calculating a value of a functional of an aerial image intensity for each selected region of the patterned article and compensating for differences in a generation of the different frames,
   wherein the compensating comprises partitioning each of the frames into multiple sub-frames, and calculating intra-frame coefficients by averaging aerial intensity values for sub-frames positioned at a common location within different ones of the frames.

2. The method according to claim 1, wherein the processing further comprises determining variations of at least one feature that is manufactured by utilizing the patterned article.

3. The method according to claim 1, wherein prior to receiving the data, further generating the data.

4. The method according to claim 1 wherein the processing further comprises comparing functional values associated with different selected regions with one another.

5. The method according to claim 1 wherein the processing is followed by generating a feature variation map, wherein the feature variation map comprises multiple feature variation map pixels.

6. The method according to claim 5, further comprising determining a size of one or more of the feature variation map pixels.

7. The method according to claim 1, wherein the patterned article is a mask and wherein the data is representative of an entire portion of the mask.

8. The method according to claim 1, wherein each selected region comprises a periodical pattern that comprises multiple features that are arranged in a periodical manner, and wherein the functional of the aerial image intensity is an aerial image intensity integral.

9. The method according to claim 1, wherein the parameter is a critical dimension of the feature.

10. The method according to claim 1, wherein each selected region comprises a non-periodic pattern that comprises the feature, and wherein the selected regions are selected by applying, to the data representative of the aerial image, a pattern recognition algorithm.

11. The method according to claim 1, wherein the compensating further comprises compensating for inter-frame illumination variations.

12. The method according to claim 1, wherein the receiving further comprises receiving data representative of multiple aerial images of the at least portion, and wherein different ones of the aerial images are acquired under different focal conditions.

13. A method for evaluating a variation of a parameter of a feature, the method comprising:
   receiving data representative of an aerial image of at least a portion of a patterned article that comprises multiple instances of the feature, the aerial image including multiple different frames; and
   processing the data to determine variations of the parameter of the feature, wherein the processing comprises calculating a value of a functional of an aerial image intensity for each selected region of the patterned article and compensating for differences in a generation of the different frames,
   wherein the compensating comprises receiving information representative of aerial intensities of multiple partially overlapping frame images, and determining a difference in an acquisition of each of the multiple partially overlapping frame images in response to a difference between different representations of an overlap area in each of the partially overlapping frame images.

14. A method for evaluating a variation of a parameter of a feature, the method comprising:
   receiving data representative of an aerial image of at least a portion of a patterned article that comprises multiple instances of the feature, the aerial image including multiple different frames; and
   processing the data to determine variations of the parameter of the feature, wherein the processing comprises calculating a value of a functional of an aerial image intensity for each selected region of the patterned article and compensating for differences in a generation of the different frames,
   wherein the compensating comprises calculating illumination gain coefficients which minimize differences between representations of overlap areas of partially overlapping frames.

15. The method according to claim 14, wherein the compensating further comprises calculating the illumination gain coefficients so that an average illumination gain coefficient is one.

16. The method according to claim 14, wherein the compensating further comprises calculating inter-frame and intra-frame gain coefficients by solving a non-linear set of equations.

17. A method for evaluating a variation of a parameter of a feature, the method comprising:
receiving data representative of an aerial image of at least a portion of a patterned article that comprises multiple instances of the feature, the aerial image including multiple different frames; and
processing the data to determine variations of the parameter of the feature, wherein the processing rises calculating a value of a functional of an aerial image intensity for each selected region of the patterned article and compensating for differences in a generation of the different frames,
wherein the compensating is responsive to statistics of aerial intensity values within selected areas of the patterned article, wherein each of the selected areas is larger than a sub-area in which values of the aerial intensity are correlated with one another.

18. A system for evaluating a variation of a parameter of a feature, the system comprising:
an interface adapted to receive data representative of an aerial image of at least a portion of a patterned article that comprises multiple instances of the feature, the aerial image comprising multiple different frames; and
a processor adapted to process the data to determine variations of the parameter of the feature, wherein the processor calculates a value of a functional of an aerial image intensity for each selected region of the patterned article and compensate for differences in a generation of the different frames,
wherein the processor is further adapted to partition each frame into multiple sub-frames, and calculate intra-frame coefficients by averaging aerial intensity values for sub-frames positioned at a common location within different ones of the frames.

19. The system according to claim 18, wherein the processor is further adapted to determine variations of at least one feature that is manufactured by utilizing the patterned article.

20. The system according to claim 18, adapted to generate the data before providing the data to the interface.

21. The system according to claim 18, wherein the processor is further adapted to compare functional values associated with different selected regions with one another.

22. The system according to claim 18, wherein the processor is further adapted to generate a feature variation map, wherein the feature variation map comprises multiple feature variation map pixels.

23. The system according to claim 22, wherein the processor is further adapted to determine a size of one or more of the feature variation map pixels.

24. The system according to claim 18, wherein the patterned article is a mask and wherein the data is representative of an entire portion of the mask.

25. The system according to claim 18, wherein each selected region comprises a periodical pattern that comprises multiple features that are arranged in periodical manner, and wherein the functional of the aerial image intensity is an aerial image intensity integral.

26. The system according to claim 18, wherein the parameter is a critical dimension of the feature.

27. The system according to claim 18, wherein each selected region comprises a non-periodic pattern that comprises the feature, and wherein the processor selects regions by applying, to the data representative of the aerial image, a pattern recognition algorithm.

28. The system according to claim 18, wherein the processor is further adapted to compensate for inter-frame illumination variations.

29. The system according to claim 18, wherein the interface is further adapted to receive data representative of multiple aerial images of the at least portion, wherein different one of the aerial images are acquired under different focal conditions.

30. A system for evaluating a variation of a parameter of a feature, the system comprising:
an interface adapted to receive data representative of an aerial image of at least a portion of a patterned article that comprises multiple instances of the feature, the aerial image comprising multiple different frames; and
a processor adapted to process the data to determine variations of the parameter of the feature, wherein the processor calculates a value of a functional of an aerial image intensity for each selected region of the patterned article and compensate for differences in a generation of the different frames,
wherein the processor is further adapted to receive information representative of aerial intensities of multiple partially overlapping frame images, and determine a difference in an acquisition of each of the multiple partially overlapping frame images in response to a difference between different representations of an overlap area in each of the partially overlapping frame images.

31. A system for evaluating a variation of a parameter of a feature, the system comprising:
an interface adapted to receive data representative of an aerial image of at least a portion of a patterned article that comprises multiple instances of the feature, the aerial image comprising multiple different frames; and
a processor adapted to process the data to determine variations of the parameter of the feature, wherein the processor calculates a value of a functional of an aerial image intensity for each selected region of the patterned article and compensate for differences in a generation of the different frames,
wherein the processor is further adapted to calculate illumination gain coefficients which minimize differences between representations of overlap areas of partially overlapping frames.

32. The system according to claim 31, wherein the processor is further adapted to calculate the illumination gain coefficients so that an average illumination gain coefficient is one.

33. The system according to claim 31, wherein the processor is further adapted to calculate inter-frame and intra-frame gain coefficients by solving a non-linear set of equations.

34. A system for evaluating a variation of a parameter of a feature, the system comprising:
an interface adapted to receive data representative of an aerial image of at least a portion of a patterned article that comprises multiple instances of the feature, the aerial image comprising multiple different frames; and
a processor adapted to process the data to determine variations of the parameter of the feature, wherein the processor calculates a value of a functional of an aerial image intensity for each selected region of the patterned article and compensate for differences in a generation of the different frames,
wherein the processor is further adapted to compensate for differences in response to statistics of aerial intensity values within selected areas of the patterned article, wherein each of the selected areas is larger than a sub-area in which values of the aerial intensity are correlated with one another.

* * * * *